United States Patent
Qu et al.

(10) Patent No.: US 11,316,662 B2
(45) Date of Patent: Apr. 26, 2022

(54) METHOD AND APPARATUS FOR POLICY HIDING ON CIPHERTEXT-POLICY ATTRIBUTE-BASED ENCRYPTION

(71) Applicant: KONINKLIJKE PHILIPS N.V., Eindhoven (NL)

(72) Inventors: Jin Qu, Shanghai (CN); Fubiao Xia, Shanghai (CN); Xin Ge, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 263 days.

(21) Appl. No.: 16/513,216

(22) Filed: Jul. 16, 2019

(65) Prior Publication Data
US 2020/0036516 A1    Jan. 30, 2020

(30) Foreign Application Priority Data

Jul. 30, 2018  (WO) ................ PCT/CN2018/097744
Aug. 31, 2018  (EP) ..................................... 18191884

(51) Int. Cl.
| | | |
|---|---|---|
| H04L 29/06 | (2006.01) | |
| H04L 9/06 | (2006.01) | |
| H04L 9/08 | (2006.01) | |
| H04L 9/30 | (2006.01) | |

(52) U.S. Cl.
CPC .......... *H04L 9/0637* (2013.01); *H04L 9/0861* (2013.01); *H04L 9/0894* (2013.01); *H04L 9/30* (2013.01); *H04L 63/20* (2013.01)

(58) Field of Classification Search
CPC ..... H04L 9/0637; H04L 63/20; H04L 9/0894; H04L 9/0861; H04L 9/30; H04L 9/088; H04L 9/083; H04L 9/3073; H04L 9/0847; H04L 9/0825
See application file for complete search history.

(56) References Cited

U.S. PATENT DOCUMENTS 7,634,085 B1 * 12/2009 Sahai ................ H04L 9/3073
                                            380/255
8,559,631 B1 * 10/2013 Waters ................ H04L 9/3073
                                            380/28
9,077,525 B2    7/2015 Chandran et al.
(Continued)

FOREIGN PATENT DOCUMENTS

CN    103501223 A  *  1/2014
CN    104079574 A  *  10/2014
(Continued)

OTHER PUBLICATIONS

"Trivial Group—Wikipedia", https://en.wikipedia.org/wiki/Trivial_group#:~:text=In%20mathematics%2C%20a%20trivial%20group,speaks%20of%20the%20trivial%20group. (Year: 2021).*
(Continued)

*Primary Examiner* — John B King

(57) ABSTRACT

Various embodiments relate to a method and apparatus for policy-hiding on ciphertext-policy attribute based encryption, the method including the steps of categorizing each of a plurality of attributes into a plurality of groups where each of the plurality of groups has a group attribute, inputting a policy and a message into an encryption algorithm and outputting a ciphertext; and encrypting an AND subtree in the policy and outputting a sub-cipher.

20 Claims, 5 Drawing Sheets

(56) References Cited

U.S. PATENT DOCUMENTS

| | | | |
|---|---|---|---|
| 9,774,577 B2 | 9/2017 | Lokamathe et al. | |
| 2012/0258777 A1* | 10/2012 | Huang | H04W 4/60 |
| | | | 455/557 |
| 2012/0260094 A1 | 10/2012 | Asim et al. | |
| 2014/0129845 A1 | 5/2014 | Vaikuntanathan et al. | |
| 2015/0358436 A1* | 12/2015 | Kim | H04L 45/745 |
| | | | 370/392 |
| 2015/0372997 A1* | 12/2015 | Lokamathe | H04L 63/062 |
| | | | 713/171 |
| 2017/0093817 A1* | 3/2017 | Khoury | H04L 63/105 |
| 2017/0124336 A1* | 5/2017 | Freudiger | G06F 40/242 |

FOREIGN PATENT DOCUMENTS

| | | | | |
|---|---|---|---|---|
| CN | 104363215 A | * | 2/2015 | |
| CN | 105141574 A | * | 12/2015 | H04L 29/06 |
| CN | 106506155 A | * | 3/2017 | |
| CN | 106549758 A | * | 3/2017 | |
| CN | 106790074 A | * | 5/2017 | |
| CN | 107968780 A | * | 4/2018 | |
| JP | 2017126851 A | * | 7/2017 | |
| KR | 101593165 B1 | * | 2/2016 | G06F 21/602 |
| WO | WO-2014148960 A1 | * | 9/2014 | G06F 21/6245 |
| WO | 2016014048 A1 | | 1/2016 | |

OTHER PUBLICATIONS

"Trivial Group - MathWorld", https://mathworld.wolfram.com/TrivialGroup.html (Year: 2021).*

Nishide et al., "Attribute-Based Encryption with Partially Hidden Encryptor-Specified Access Structures", In: "Applied Cryptography and Network Security". ACNS 2008. Lecture Notes in Computer Science, vol. 5037, pp. 111-129 (Year: 2008).*

Liu et al., "Ciphertext-policy attribute-based encryption with partially hidden access structure and its application to privacy-preserving electronic medical record system in cloud environment", Security Comm. Networks, 2016 (Year: 2016).*

Ibraimi, et al., "Secure Management of Personal Health Records by Applying Attribute-Based Encryption", Philips Research, Eindhoven, The Netherlands, 6 pages. (Abstract).

Khan, et al., "An Expressive Hidden Access Policy CP-ABE", 2017 IEEE Second International Conference on Data Science in Cyberspace, Jun. 26, 2017, pp. 178-186.

Ramu, G., "A secure cloud framework to share EHRs using modified CP-ABE and the attribute bloom filter", Education and Information Technologies, Springer US, Boston, vol. 23, No. 5, Apr. 17, 2018, pp. 2213-2233.

Lai, et al., "Fully Secure Cipertext-Policy Hiding CP-ABE", In: "Serious Games", Jan. 1, 2011, Springer International Publishing, vol. 6672, pp. 24-39.

Belguith, et al., "PHOABE: Securely outsourcing multi-authority attribute based encryption with policy hidden for cloud assisted IoT", Computer Networks, vol. 133, Mar. 1, 2018, pp. 141-156.

He, et al., "An energy efficient privacy-preserving content sharing scheme in mobile social networks", Personal and Ubiquitous Computing, Springer Verlag, London, GB, vol. 20, No. 5, Oct. 1, 2016, pp. 833-846.

European Search Report for European Application No. 18191884, dated Feb. 12, 2019, 2 pages.

* cited by examiner

METHOD AND APPARATUS FOR POLICY HIDING ON CIPHERTEXT-POLICY ATTRIBUTE-BASED ENCRYPTION

RELATED APPLICATIONS

This application claims the benefit of and priority to European Application Serial No. 18191884.8, filed Aug. 31, 2018, and International Application Serial No. PCT/CN2018/097744, filed Jul. 30, 2018. These applications are incorporated by reference herein.

TECHNICAL FIELD

This disclosure relates generally to attribute based encryption ("ABE"), and more specifically, but not exclusively, to policy hiding in a ciphertext policy based ABE.

BACKGROUND

There are two types of ABEs, known as ciphertext policy ABE ("CP-ABE") and key-policy ABE ("KP-ABE").

For CP-ABE, a cipher is computed by associating it with an access policy, which is represented as an access tree or an access structure. Only the recipient whose attributes match that access tree may correctly decrypt the ciphertext.

For KP-ABE, a cipher is computed by associating it with a set of attributes and only the recipient whose access tree matches the cipher's attributes may correctly decrypt the ciphertext.

By using the access tree structure, confidential information may be disclosed. For example, if the access tree for a cipher is ("University" AND ("Chemistry" OR "Biology")), a third party may determine that the cipher may be correctly decrypted by a special categorize of parties, such as the computers located within the school of Chemistry within that university.

Another example may be a personal health record ("PHR") which is encrypted and accessed by certain parties, such as the patient or the physicians in charge of the treatment in the hospital and therefore, the PHR may have an access tree such as ("Patient Bob's ID number" OR "m.d.livercancer@hospital.com"). Therefore, anyone who receives the ciphertext may obtain the partial information which may be sensitive and likely correct, such as, like "Bob may have liver cancer".

SUMMARY

A brief summary of various embodiments is presented below. Embodiments address a method and apparatus for policy hiding on ciphertext-policy attribute-based encryption.

A brief summary of various example embodiments is presented. Some simplifications and omissions may be made in the following summary, which is intended to highlight and introduce some aspects of the various example embodiments, but not to limit the scope of the invention.

Detailed descriptions of example embodiments adequate to allow those of ordinary skill in the art to make and use the inventive concepts will follow in later sections.

Various embodiments relate to a method for policy-hiding on ciphertext-policy attribute based encryption, the method comprising the steps of categorizing each of a plurality of attributes into a plurality of groups where each of the plurality of groups has a group attribute, inputting a policy and a message into an encryption algorithm and outputting a ciphertext and encrypting an AND subtree in the policy and outputting a sub-cipher.

In an embodiment of the present disclosure, the method for policy-hiding on cipher-policy attribute based encryption, the method including the step of converting the sub-cipher into a partially-hidden policy.

In an embodiment of the present disclosure, the method for policy-hiding on cipher-policy attribute based encryption, the method further including the step of inputting a security parameter and an attribute set into a setup algorithm and outputting a system master public key and a master session key.

In an embodiment of the present disclosure, the method for policy-hiding on cipher-policy attribute based encryption, the method further including the step of inputting the master session key and the attribute set into the key generation algorithm and outputting a secret key.

In an embodiment of the present disclosure, the method for policy-hiding on cipher-policy attribute based encryption, the method further including the steps of inputting the partially-hidden policy and the ciphertext into a decryption algorithm, recovering the policy and the attribute set from the partially hidden policy using the secret key and computing the message using the ciphertext, the policy, the secret key and the attribute set.

In an embodiment of the present disclosure, the encrypting of the AND subtree in the policy by inputting the AND subtree and a branch of the AND subtree into the encryption algorithm.

In an embodiment of the present disclosure, the encrypting of the AND subtree in the policy by using the group attribute which covers the AND subtree.

Various embodiments relate to a method for policy-hiding on ciphertext-policy attribute based encryption, the method including the steps of categorizing each of a plurality of attributes into a plurality of groups where each of the plurality of groups has a group attribute, inputting a policy and a message into an encryption algorithm and outputting a ciphertext, inputting a subtree and the group attribute into the encryption algorithm and outputting a cipher and replacing the subtree with the cipher.

In an embodiment of the present disclosure, the method for policy-hiding on cipher-policy attribute based encryption, the method including the step of converting the cipher into a partially-hidden policy.

In an embodiment of the present disclosure, the method for policy-hiding on cipher-policy attribute based encryption, the method further including the step of inputting a security parameter and an attribute set into a setup algorithm and outputting a system master public key and a master session key.

In an embodiment of the present disclosure, the method for policy-hiding on cipher-policy attribute based encryption, the method further including the step of inputting the master session key and the attribute set into the key generation algorithm and outputting a secret key.

In an embodiment of the present disclosure, the method for policy-hiding on cipher-policy attribute based encryption, the method further including the steps of inputting the partially-hidden policy and the ciphertext into a decryption algorithm, recovering the policy and the attribute set from the partially hidden policy using the secret key and computing the message using the ciphertext, the policy, the secret key and the attribute set.

Various embodiments relate to an apparatus for policy-hiding on ciphertext-policy attribute based encryption, the apparatus including a memory and a processor configured to categorize each of a plurality of attributes into a plurality of groups where each of the plurality of groups has a group attribute, input a policy and a message into an encryption algorithm and output a ciphertext and encrypt an AND subtree in the policy and outputting a sub-cipher.

In an embodiment of the present disclosure, the processor is further configured to convert the sub-cipher into a partially-hidden policy.

In an embodiment of the present disclosure, the processor is further configured to input a security parameter and an attribute set into a setup algorithm and output a system master public key and a master session key.

In an embodiment of the present disclosure, the processor is further configured to input the master session key and the attribute set into the key generation algorithm and output a secret key.

In an embodiment of the present disclosure, the processor is further configured to input the partially-hidden policy and the ciphertext into the decryption algorithm, recover the policy and the attribute set from the partially hidden policy using the secret key and compute the message using the ciphertext, the policy, the secret key and the attribute set.

The apparatus for policy-hiding on cipher-policy attribute based encryption of claim 16, wherein the encrypting of the AND subtree in the policy by inputting the AND subtree and a branch of the AND subtree into the encryption algorithm.

In an embodiment of the present disclosure, the encrypting of the AND subtree in the policy by using the group attribute which covers the AND subtree.

In an embodiment of the present disclosure, an apparatus for policy-hiding on ciphertext-policy attribute based encryption, the apparatus including a memory and a processor configured to categorize each of a plurality of attributes into a plurality of groups where each of the plurality of groups has a group attribute, input a policy and a message into an encryption algorithm and output a ciphertext, input a subtree and the group attribute into the encryption algorithm and output a cipher; and replace the subtree with the cipher.

In an embodiment of the present disclosure, the processor is further configured to convert the cipher into a partially-hidden policy.

In an embodiment of the present disclosure, the processor is further configured to input a security parameter and an attribute set into a setup algorithm and output a system master public key and a master session key.

In an embodiment of the present disclosure, the processor is further configured to input the master session key and the attribute set into the key generation algorithm and output a secret key.

In an embodiment of the present disclosure, the processor is further configured to input the partially-hidden policy and the ciphertext into the decryption algorithm, recover the policy and the attribute set from the partially hidden policy using the secret key and compute the message using the ciphertext, the policy, the secret key and the attribute set.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims and explain various principles and advantages of those embodiments.

These and other more detailed and specific features are more fully disclosed in the following specification, reference being had to the accompanying drawings, in which.

DETAILED DESCRIPTION

Figure 1:
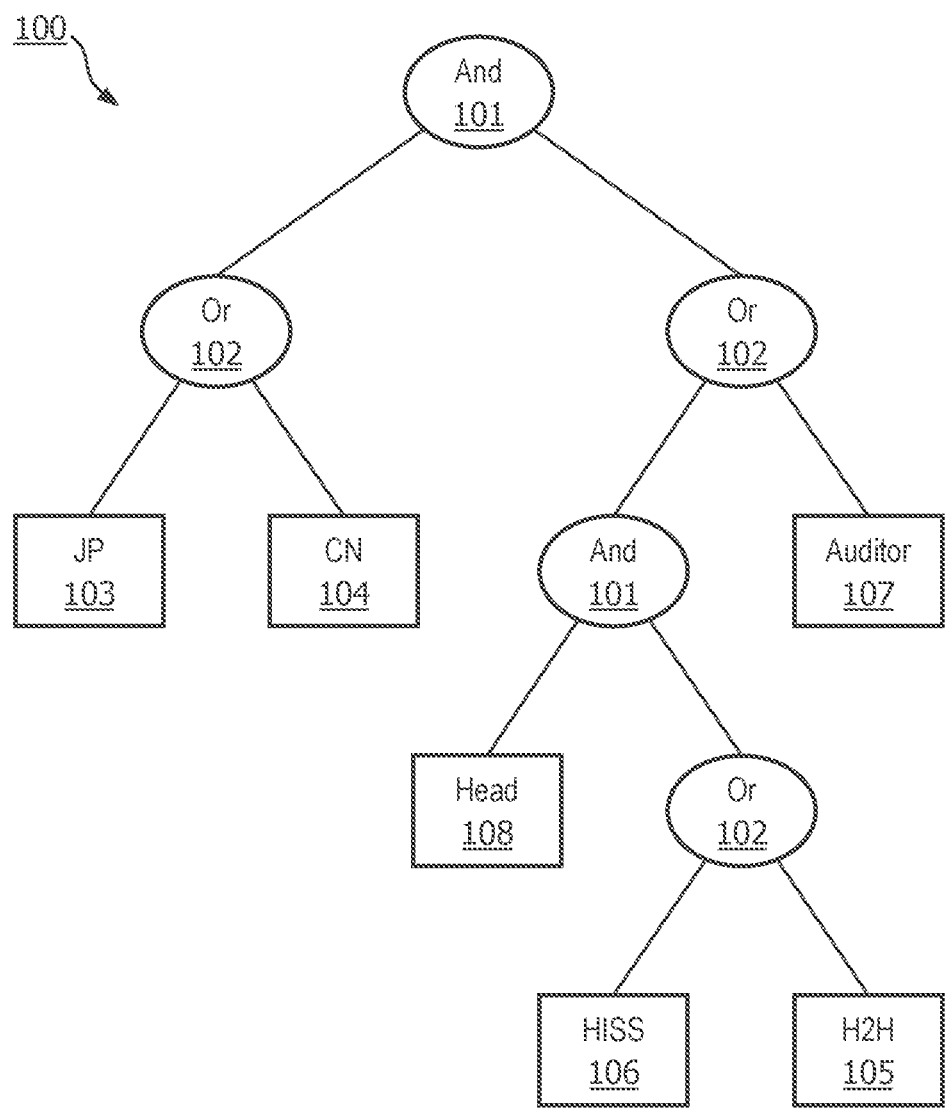
FIG. 1 illustrates an original policy access tree.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

The current embodiment addresses a method to protect the policy (i.e., the access tree information) by hiding the sensitive portions of the policy, while retaining the necessary portions of the policy.

In order to hide the sensitive portions of the policy, a group-based attribute set is defined in a CP-ABE system. All of the attributes may belong to a certain group and that group may have a common attribute.

By creating a group with a common attribute, the original policy is hidden and replaced with a group with a visible common attribute and invisible detailed attributes. Therefore, anyone with a key with the common attribute may see a partial policy corresponding to the certain group.

The general access policy may be represented by an access tree which may be composed of nodes of logical operators including, AND, OR, n OF m (i.e., a threshold operator) and leaves of attributes.

FIG. 1 illustrates an original policy access tree 100.

FIG. 1 includes logical operators "AND" 101 and logical operators "OR" 102.

The policy in the original policy access tree 100 is that only the individual user from either the region Japan 103 or China 104 and the individual user who is either a business head 108 from the H2H 105 or from the HISS 106, or a security auditor 107 may decrypt the encrypted data record.

The original policy access tree 100 discloses sensitive data in the known policy. For example, anyone may access this policy and know that an individual user must be from either Japan 103 or China 104 and must be either a business head 104 of HISS 106 or H2H 105 or a security auditor 107 to access the encrypted data.

Figure 2:
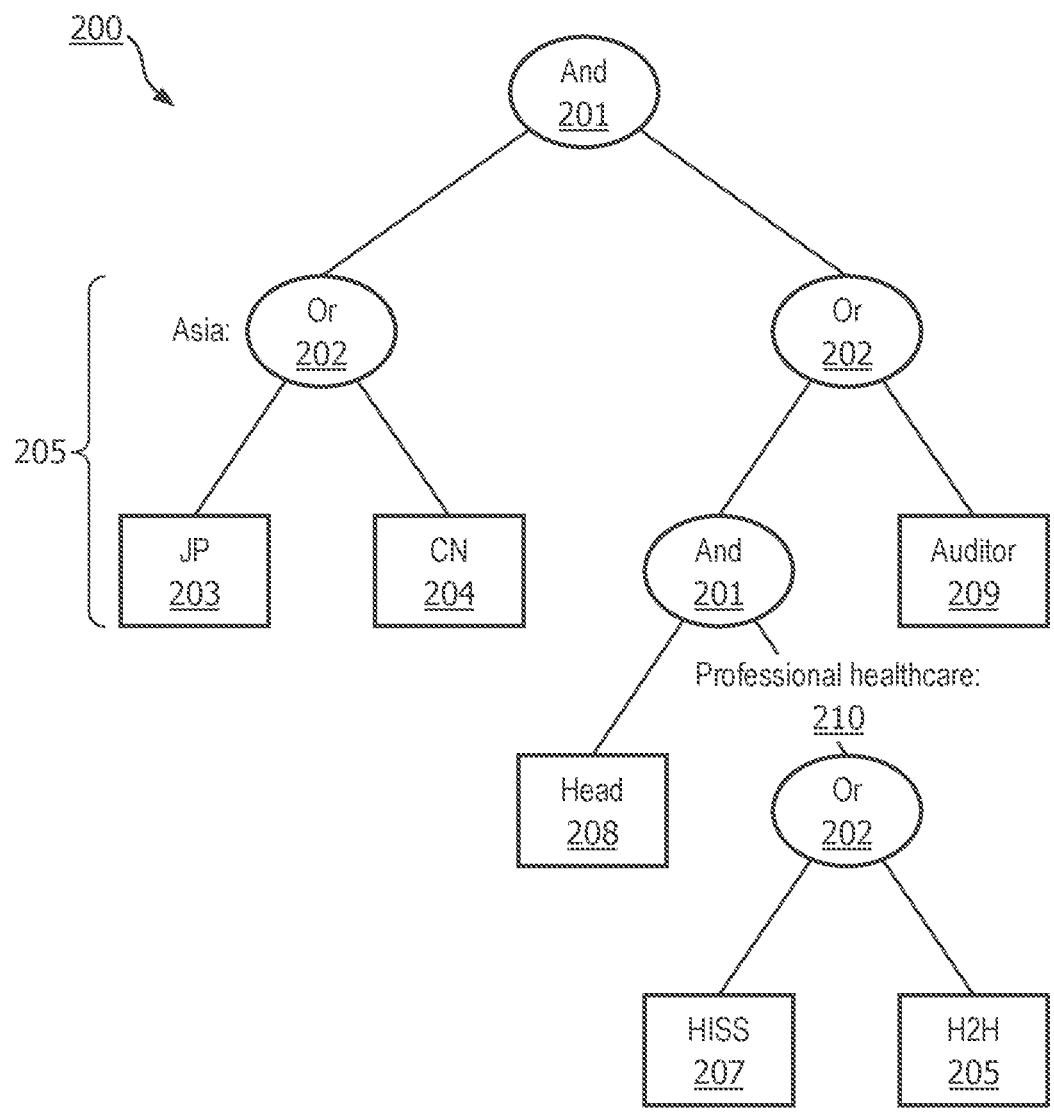
FIG. 2 illustrates a group-based policy access tree of the current embodiment.

FIG. 2 illustrates a group-based policy access tree 200 of the current embodiment.

The group-based policy access tree 200 includes logical operators "AND" 201 and logical operations "OR" 202.

Attribute types may be, for example, region, business and position. Group attributes may be Asia 205 and professional healthcare 210.

Asia 205 is a higher level attribute of Japan 203 and China 204. Professional healthcare 210 is a higher level attribute of HISS 207 and H2H 206.

For example, for region, the group attribute may be a tree structure, the top level being all regions, then divided into regions such as Americas, Europe, Asia 205, then dividing Asia in Japan 203 and China 204 then dividing China 204 into Shanghai, Beijing, Guangdong.

For example, for position, the group attribute may be a tree structure, the top level being all businesses, then dividing into personal health, professional healthcare 210, other businesses, then dividing professional healthcare 210 into HISS 207 and H2H 206 and dividing other businesses into IP&S.

FIG. 2 illustrates the original access policy tree 100 from FIG. 1 in a group-based policy access tree 200.

In the current embodiment, to hide a portion of the policy, the logical operator "OR" 202 marked with "PROFESSIONAL HEALTHCARE" 210 may be hidden. More specifically, the input plaintext is the logical operator "OR" 202 subtree and the input policy is "PROFESSIONAL HEALTHCARE" 210. Therefore, anyone with a group attribute called "PROFESSIONAL HEALTHCARE" 210 may decrypt the ciphertext.

Figure 3:
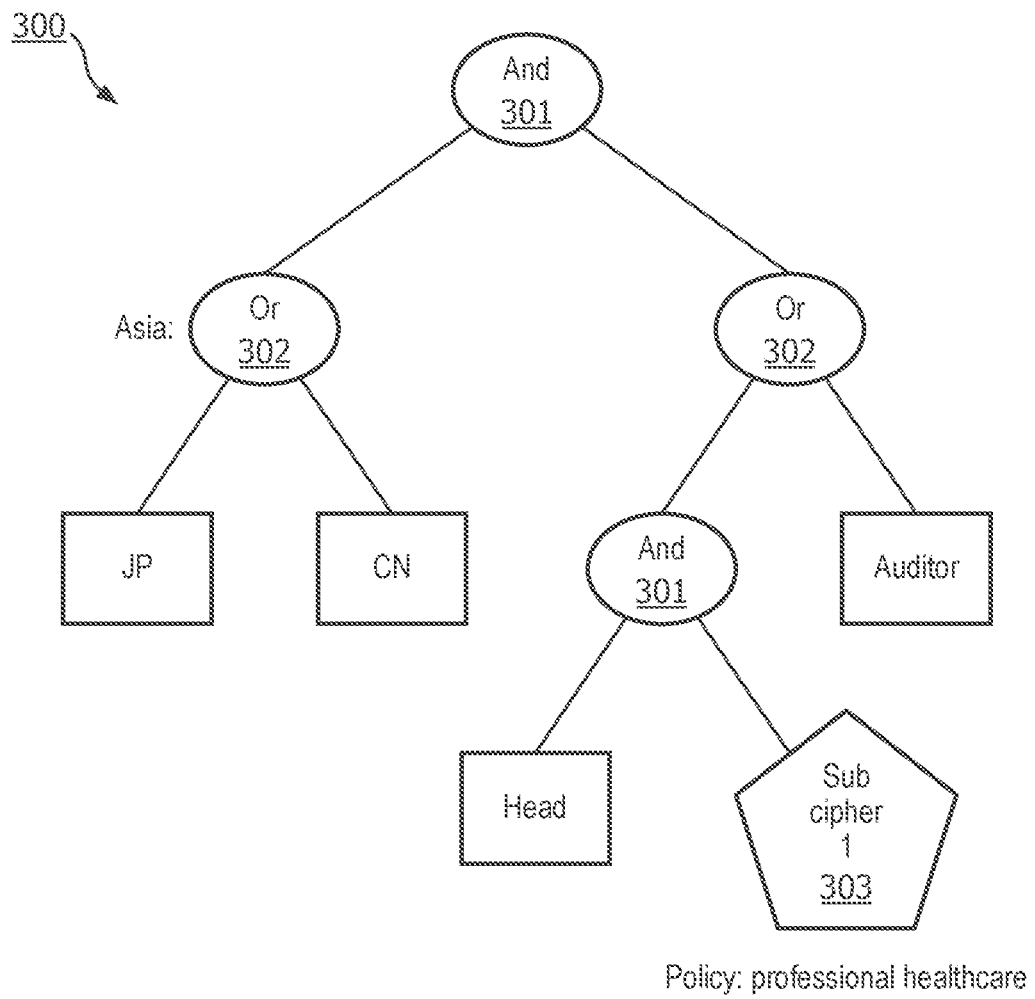
FIG. 3 illustrates a group-based policy access tree with partial hiding via "group" attribute of the current embodiment.

FIG. 3 illustrates a group-based policy access tree 300 with partial hiding via "group" attribute of the current embodiment.

FIG. 3 includes logical operators "AND" 301 and logical operators "OR" 302.

The logical operator "OR" 202 subtree from FIG. 2 has been replaced by sub-cipher 1 303 with the visible policy of "PROFESSIONAL HEALTHCARE". In the current embodiment, anyone with a key which contains the common group attribute, "PROFESSIONAL HEALTHCARE" may decrypt sub-cipher 1 303 which would show the two business units which may access the encrypted data, the business head 208 of cardiology 207 or H2H 206 from FIG. 2.

Figure 4:
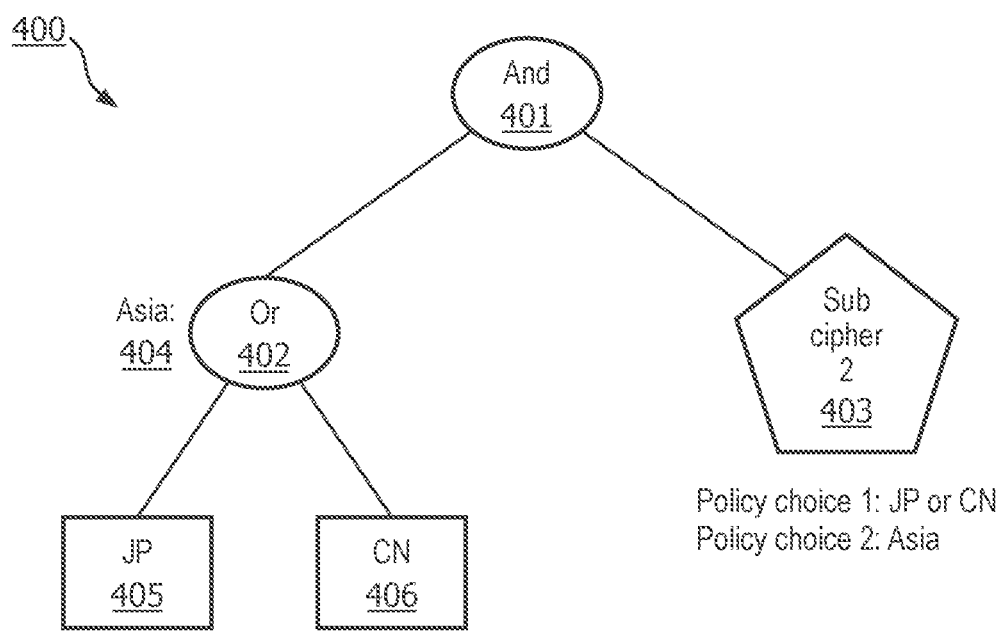
FIG. 4 illustrates a group-based policy access tree with partial hiding via "AND" subtree of the current embodiment.

FIG. 4 illustrates a group-based policy access tree 400 with partial hiding via "AND" subtree of the current embodiment.

FIG. 4 includes logical operators "AND" 401 and logical operations "OR" 402.

In an alternative embodiment, in order to hide a portion of the policy may be to decrypt any logical operator "AND" 401 subtree and the associated policy may be either from the left-branch or right-branch, depending on how the central data authority would like the policy to be known.

For example, sub-cipher 2 403 may only be decrypted by either anyone with a key including their location being either Japan 405 or China 406 because the policy, which is known, requires a key from anyone who has their location being either Japan 405 or China 406. Sub-cipher 2 403 may also be decrypted by anyone with a key including their location being "Asia" 404. By using sub-cipher 2 403, the "PROFESSIONAL HEALTHCARE" and "POSITION" are hidden in the sub-cipher 2 403 and may only be decrypted by anyone who has their location being either "Asia" 404 or as being either Japan 405 or China 406.

The example uses the policy from the left branch, which is known, as the policy for the sub-cipher 2 403.

The embodiments may be implemented by upgrading the existing CP-ABE system or by setting up a new CP-ABE system.

Setting up the current embodiment method, (i.e., a policy-hiding CP-ABE scheme), requires a first step of attribute setup which requires all attributes $(A_1, A_2, A_3, \ldots, A_n)$ to be categorized into different groups, each group may be allocated into a group attribute.

The group-based attributes, $\Sigma$ may be defined as:

$$\Sigma = (G_1:(A_1, \ldots, A_i), G_2:(A_{i+1}, \ldots, A_j), \ldots, G_m:(A_{k+1}, \ldots, A_n)).$$

$G_i$ is the group and $A_i$ is the attribute.

Each group-based attributes set, $\Sigma$ contains the corresponding group attributes, $A_i$.

The second step includes setup which uses the same algorithm as in CP-ABE, taking a security parameter, which may be a variable that measures the input size of the computational problem, for example, a key length (i.e., a group-based attribute set) $\lambda$ and $\Sigma$ as inputs and outputs a system public key master public key ("MPK") and the master session key ("MSK").

The third step includes key generation which uses the same algorithm as in CP-ABE which takes the MSK and an attribute set $\varepsilon$ as inputs and outputs a private key, $SK_\varepsilon$.

The fourth step includes encryption which uses a similar algorithm as the one in CP-ABE which inputs a policy (i.e., an access structure/tree), $\mathcal{L}$ and a message m, which is the data to be encrypted and outputs a ciphertext, CT.

The fifth step includes policy hiding which inputs the policy, $\mathcal{L}$ and the ciphertext, CT as input and outputs the partially-hidden policy $\mathcal{L}'$ which is associated with the ciphertext, CT.

The fifth step of policy hiding may include "AND" subtree hiding which includes an algorithm which inputs the policy, $\mathcal{L}$ and for any "AND" operator, it may encrypt the whole "AND" subtree by using the fourth step of encryption by inputting the input message, which is the "AND" subtree and the policy, $\mathcal{L}$ which may be one branch of the "AND" subtree and outputs a sub-cipher, CT'. The policy, $\mathcal{L}$ is then represented by hiding the "AND" subtree with the sub-cipher CT', which is converted into the partially-hidden, $\mathcal{L}'$.

The fifth step of policy hiding may include group hiding which inputs the policy, $\mathcal{L}$ and uses the fourth step of encryption as a subroutine which takes the subtree as the input message, m and the group-attribute as the policy, $\mathcal{L}$ and outputs a CP-ABE cipher, CT' on the subtree. The cipher, CT' may be embedded into the policy, $\mathcal{L}$ to replace the subtree and the final output policy is the partially-hidden, $\mathcal{L}'$.

The sixth step includes decryption which uses the similar algorithm as in CP-ABE which inputs a partially-hidden policy, $\mathcal{L}'$ and the ciphertext, CT and recovers the policy, $\mathcal{L}$ from the partially-hidden policy, $\mathcal{L}'$ by using the secret key, $SK_\varepsilon$ and the associated attribute set, $\varepsilon$. If the recovery process is successful then a plaintext, m is computed by using the ciphertext, CT, the policy $\mathcal{L}$, the secret key $SK_\varepsilon$ and the associated attribute set, $\varepsilon$.

Figure 5:
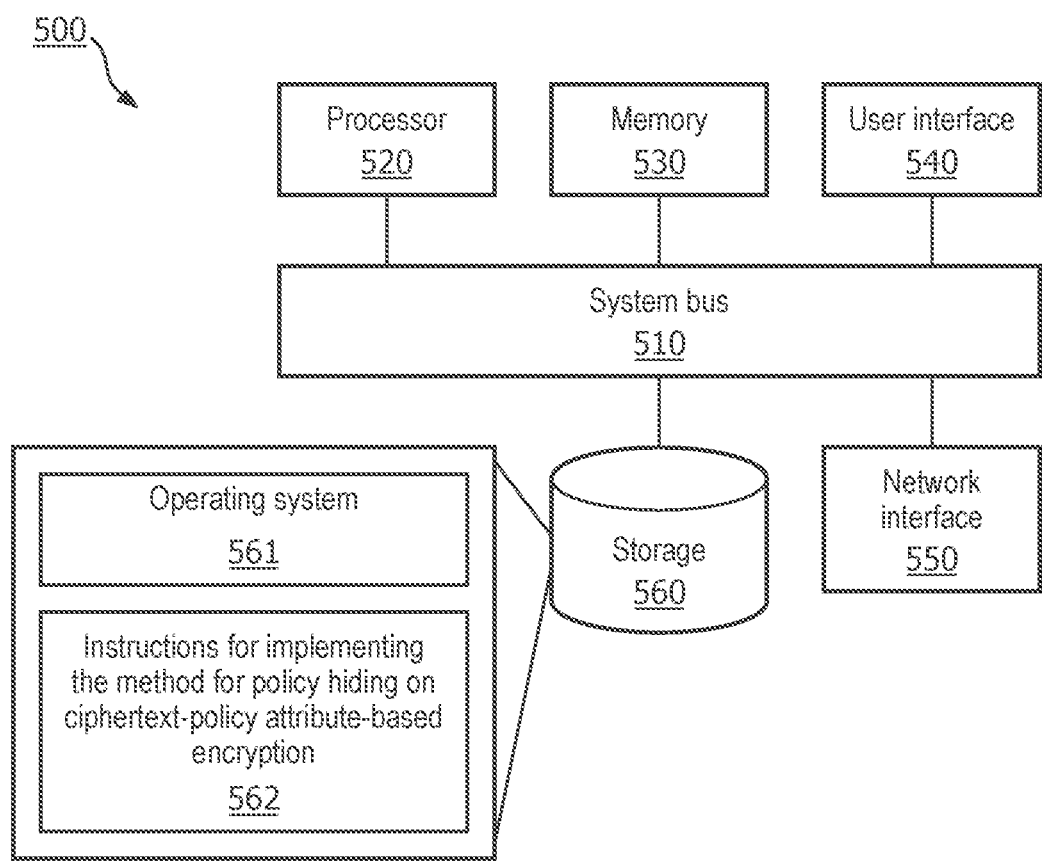
FIG. 5 illustrates a block diagram of a real-time data processing system of the current embodiment.

FIG. 5 illustrates an exemplary hardware diagram 500 for implementing a method for hybrid trust management for health records audit. As shown, the device 500 includes a processor 520, memory 530, user interface 540, network interface 550, and storage 560 interconnected via one or more system buses 510. It will be understood that FIG. 5 constitutes, in some respects, an abstraction and that the actual organization of the components of the device 500 may be more complex than illustrated.

The processor 520 may be any hardware device capable of executing instructions stored in memory 530 or storage 560 or otherwise processing data. As such, the processor may include a microprocessor, field programmable gate array (FPGA), application-specific integrated circuit (ASIC), or other similar devices.

The memory 530 may include various memories such as, for example L1, L2, or L3 cache or system memory. As such, the memory 530 may include static random access memory (SRAM), dynamic RAM (DRAM), flash memory, read only memory (ROM), or other similar memory devices.

The user interface 540 may include one or more devices for enabling communication with a user such as an administrator. For example, the user interface 540 may include a display, a mouse, and a keyboard for receiving user commands. In some embodiments, the user interface 540 may include a command line interface or graphical user interface that may be presented to a remote terminal via the network interface 550.

The network interface 550 may include one or more devices for enabling communication with other hardware devices. For example, the network interface 550 may include a network interface card (NIC) configured to communicate according to the Ethernet protocol. Additionally, the network interface 550 may implement a TCP/IP stack for communication according to the TCP/IP protocols. Various alternative or additional hardware or configurations for the network interface 550 will be apparent.

The storage 560 may include one or more machine-readable storage media such as read-only memory (ROM), random-access memory (RAM), magnetic disk storage media, optical storage media, flash-memory devices, or similar storage media. In various embodiments, the storage 560 may store instructions for execution by the processor 520 or data upon with the processor 520 may operate. For example, the storage 560 may store a base operating system 561 for controlling various basic operations of the hardware 500 and instructions for implementing the method for policy-hiding on ciphertext-policy attribute-based encryption.

It will be apparent that various information described as stored in the storage 560 may be additionally or alternatively stored in the memory 530. In this respect, the memory 530 may also be considered to constitute a "storage device" and the storage 560 may be considered a "memory." Various other arrangements will be apparent. Further, the memory 530 and storage 560 may both be considered "non-transitory machine-readable media." As used herein, the term "non-transitory" will be understood to exclude transitory signals but to include all forms of storage, including both volatile and non-volatile memories.

While the host device 500 is shown as including one of each described component, the various components may be duplicated in various embodiments. For example, the processor 520 may include multiple microprocessors that are configured to independently execute the methods described herein or are configured to perform steps or subroutines of the methods described herein such that the multiple processors cooperate to achieve the functionality described herein. Further, where the device 500 is implemented in a cloud computing system, the various hardware components may belong to separate physical systems. For example, the processor 520 may include a first processor in a first server and a second processor in a second server.

These embodiments address the technological problem of disclosure of information from the cipher of an access tree where a third party may learn which group or individual may correctly decrypt the cipher, therefore, these embodiments present a method to hide this information to prevent the disclosure of the information.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for policy-hiding on ciphertext-policy attribute based encryption, the method comprising:
categorizing each of a plurality of attributes into a plurality of groups, wherein each group of the plurality of groups has a group attribute;
inputting a policy and a message into an encryption algorithm and outputting a ciphertext; and
inputting the policy and the ciphertext and outputting a partially-hidden policy associated with the ciphertext, wherein outputting the partially-hidden policy comprises encrypting an AND subtree in the policy and outputting a sub-cipher, and converting the sub-cipher into the partially-hidden policy, wherein a portion of the partially-hidden policy is visible to an unauthorized user.

2. The method of claim 1, further comprising:
inputting a security parameter and an attribute set into a setup algorithm and outputting a system master public key and a master session key.

3. The method of claim 2, further comprising:
inputting the master session key and the attribute set into a key generation algorithm and outputting a secret key.

4. The method of claim 3, further comprising:
inputting the partially-hidden policy and the ciphertext into a decryption algorithm;
recovering the policy and the attribute set from the partially-hidden policy using the secret key; and
computing the message using the ciphertext, the policy, the secret key and the attribute set.

5. The method of claim 1, wherein encrypting the AND subtree in the policy comprises inputting the AND subtree and a branch of the AND subtree into the encryption algorithm.

6. The method of claim 1, wherein encrypting the AND subtree in the policy comprises using the group attribute which covers the AND subtree.

7. A method for policy-hiding on ciphertext-policy attribute based encryption, the method comprising:
categorizing each of a plurality of attributes into a plurality of groups, wherein each group of the plurality of groups has a group attribute;
inputting a policy and a message into an encryption algorithm and outputting a ciphertext;
inputting a subtree and the group attribute into the encryption algorithm and outputting a cipher providing a partially-hidden policy; and
replacing the subtree with the cipher, wherein a portion of the partially-hidden policy is visible to an unauthorized user.

8. The method of claim 7, further comprising:
inputting a security parameter and an attribute set into a setup algorithm and outputting a system master public key and a master session key.

9. The method of claim 8, further comprising:
inputting the master session key and the attribute set into a key generation algorithm and outputting a secret key.

10. The method of claim 9, further comprising:
inputting the partially-hidden policy and the ciphertext into a decryption algorithm;
recovering the policy and the attribute set from the partially-hidden policy using the secret key; and
computing the message using the ciphertext, the policy, the secret key and the attribute set.

11. An apparatus for policy-hiding on ciphertext-policy attribute based encryption, the apparatus comprising:
a processor; and
a memory storing instructions that, when executed by the processor, cause the processor to:
categorize each of a plurality of attributes into a plurality of groups, wherein each group of the plurality of groups has a group attribute;
input a policy and a message into an encryption algorithm and output a ciphertext; and
input the policy and the ciphertext and output a partially-hidden policy associated with the ciphertext, wherein outputting the partially-hidden policy comprises encrypting an AND subtree in the policy and outputting a sub-cipher, and converting the sub-cipher into the partially-hidden policy, wherein a portion of the partially-hidden policy is visible to an unauthorized user.

12. The apparatus of claim 11, wherein the instructions further cause the processor to:
input a security parameter and an attribute set into a setup algorithm and output a system master public key and a master session key.

13. The apparatus of claim 12, wherein the instructions further cause the processor to:
input the master session key and the attribute set into a key generation algorithm and output a secret key.

14. The apparatus of claim 13, wherein the instructions further cause the processor to:
input the partially-hidden policy and the ciphertext into a decryption algorithm;
recover the policy and the attribute set from the partially-hidden policy using the secret key; and
compute the message using the ciphertext, the policy, the secret key and the attribute set.

15. The apparatus of claim 13, wherein the instructions further cause the processor to encrypt the AND subtree in the policy by inputting the AND subtree and a branch of the AND subtree into the encryption algorithm.

16. The apparatus of claim 13, wherein the instructions further cause the processor to encrypt the AND subtree in the policy by using the group attribute which covers the AND subtree.

17. An apparatus for policy-hiding on ciphertext-policy attribute based encryption, the apparatus comprising:
a processor; and
a memory storing instructions that, when executed by the processor, cause the processor to:
categorize each of a plurality of attributes into a plurality of groups, wherein each group of the plurality of groups has a group attribute;
input a policy and a message into an encryption algorithm and output a ciphertext;

input a subtree and the group attribute into the encryption algorithm and output a cipher providing a partially-hidden policy; and replace the subtree with the cipher, wherein a portion of the partially-hidden policy is visible to an unauthorized user.

18. The apparatus of claim 17, wherein the instructions further cause the processor to:

input a security parameter and an attribute set into a setup algorithm and output a system master public key and a master session key.

19. The apparatus of claim 18, wherein the instructions further cause the processor to:

input the master session key and the attribute set into a key generation algorithm and output a secret key.

20. The apparatus of claim 19, wherein the instructions further cause the processor to:

input the partially-hidden policy and the ciphertext into a decryption algorithm;

recover the policy and the attribute set from the partially-hidden policy using the secret key; and compute the message using the ciphertext, the policy, the secret key and the attribute set.

\* \* \* \* \*